United States Patent [19]

Beecken

[11] Patent Number: 4,558,133

[45] Date of Patent: Dec. 10, 1985

[54] P-(PYRIDINIUM-VINYL)-N,N-(DISUBSTITUTED-ANILINE SALTS FOR DYEING PAPER AND THEIR PREPARATION

[75] Inventor: Hermann Beecken, Bergisch Gladbach, Fed. Rep. of Germany

[73] Assignee: Bayer Aktiengesellschaft, Leverkusen, Fed. Rep. of Germany

[21] Appl. No.: 170,412

[22] Filed: Jul. 21, 1980

[30] Foreign Application Priority Data

Aug. 8, 1979 [DE] Fed. Rep. of Germany ....... 2932092

[51] Int. Cl.$^4$ ..................... C09B 23/10; C09B 23/16; D06P 1/42; D21H 1/46
[52] U.S. Cl. .................... 546/329; 162/162; 546/330; 546/334; 546/335
[58] Field of Search ............... 542/455, 457; 546/329, 546/334, 330, 335

[56] References Cited

U.S. PATENT DOCUMENTS

| | | | |
|---|---|---|---|
| 2,112,140 | 3/1938 | Brooker et al. | 542/455 |
| 2,255,077 | 9/1941 | Middleton | 542/455 |
| 2,338,782 | 1/1944 | Riester | 542/455 |
| 2,494,032 | 1/1950 | Brooker et al. | 542/457 |
| 2,558,777 | 7/1951 | Papa et al. | 542/455 |
| 2,742,463 | 4/1956 | Finkelstein | 542/455 |
| 2,780,577 | 2/1957 | Phillips et al. | 542/457 |
| 2,808,407 | 10/1957 | Ackermann et al. | 542/455 X |
| 3,085,935 | 4/1963 | Phillips et al. | 542/457 |
| 3,152,042 | 10/1964 | Wood et al. | 542/457 |
| 3,177,116 | 4/1965 | Wood et al. | 542/455 |
| 3,179,559 | 4/1965 | Wood et al. | 542/457 |
| 3,705,895 | 12/1972 | Levy et al. | 542/455 |
| 3,974,147 | 8/1976 | Tiers et al. | 542/455 X |

OTHER PUBLICATIONS

Phillips, J. Org. Chem., vol. 14, pp. 302 to 305 (1949).
Hora et al., J. Indian Chem. Soc., vol. 49, pp. 901 to 905 (1972).

Primary Examiner—Floyd D. Higel
Attorney, Agent, or Firm—Sprung Horn Kramer & Woods

[57] ABSTRACT

Novel dyestuffs of the general formula

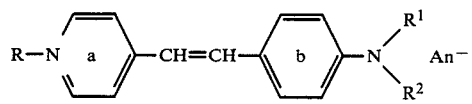

wherein
  R designates a lower alkyl or alkenyl radical and
  $R^1$ and $R^2$ designate lower alkyl or alkenyl radicals which, together with the nitrogen atom to which they are bonded, can form a 5-membered or 6-membered heterocyclic ring,
and wherein
  R, $R^1$ and $R^2$ can be substituted by non-ionic radicals, and at least one of the radicals R, $R^1$ and $R^2$ is substituted by an aryl radical, directly or via a bridge, or
  one of the radicals $R^1$ or $R^2$ represents an aryl radical, the ring a can be substituted by 1 or 2 methyl or ethyl radicals,
  the ring b can be substituted by 1 or 2 methyl, ethyl, methoxy or ethoxy radicals or by 1 halogen atom and
  An$^-$ represents an anion,
are particularly suitable for dyeing paper. They are prepared by condensing a pyridinium salt of the formula

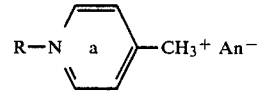

with an aldehyde of the formula

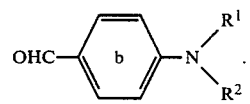

3 Claims, No Drawings

P-(PYRIDINIUM-VINYL)-N,N-(DISUBSTITUTED-ANILINE SALTS FOR DYEING PAPER AND THEIR PREPARATION

The present invention relates to styryl dyestuffs of the general formula

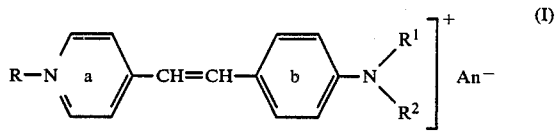

wherein

R designates a lower alkyl or alkenyl radical and $R^1$ and $R^2$ designate lower alkyl or alkenyl radicals which, together with the nitrogen atom to which they are bonded, can form a 5-membered or 6-membered heterocyclic ring, and wherein R, $R^1$ and $R^2$ can be substituted by non-ionic radicals, and at least one of the radicals R, $R^1$ and $R^2$ is substituted by an aryl radical, directly or via a bridge, or one of the radicals $R^1$ or $R^2$ represents an aryl radical, the ring a can be substituted by 1 or 2 methyl or ethyl radicals, the ring b can be substituted by 1 or 2 methyl, ethyl, methoxy or ethoxy radicals or by 1 halogen atom and An⁻ represents an anion, and their preparation and use for dyeing natural and synthetic substrates which can be dyed with cationic dyestuffs, in particular for beater-dyeing, writing on paper and printing of paper.

Preferred dyestuffs of the formula I are those of the general formula

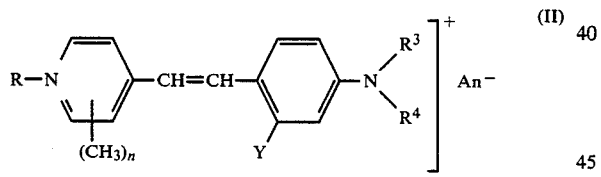

wherein

An⁻ has the abovementioned meaning,

R, $R^3$ and $R^4$ represent lower alkyl or alkenyl radicals which can be substituted by non-ionic radicals, and wherein at least one of these radicals is substituted by an aryl radical, directly or via a bridge, or one of the radicals $R^3$ or $R^4$ denotes an aryl radical, n is a number from 0 to 2 and Y is H, $CH_3$, $OCH_3$, $OC_2H_5$ or Cl.

The expression "lower alkyl radicals" above designates straight-chain or branched radicals with preferably $C_1$- to $C_4$-alkyl groups.

"Lower alkenyl radicals" are, in particular, $C_3$- or $C_4$-alkenyl radicals.

Non-ionic substituents which are customary in dyestuff chemistry are, for example, halogen, cyano, hydroxyl, $C_1$- to $C_4$-alkoxy, phenyloxy, benzyloxy, $C_1$- to $C_3$-alkylcarbonyl, $C_1$- to $C_4$-alkoxycarbonyl, benzyloxycarbonyl, $C_1$- to $C_3$-alkylcarbonyloxy, benzoyl, benzoyloxy, carbamoyl which is optionally substituted by $C_1$- to $C_4$-alkyl, phenyl or benzyl, $C_1$- to $C_4$-alkylsulphonyl, phenylsulphonyl, benzylsulphonyl, $C_1$- to $C_4$-alkylsulphonylamino, phenylsulphonylamino, benzylsulphonylamino, $C_1$- to $C_3$-alkylcarbonylamino, benzoylamino, carbamoyloxy which is optionally substituted by $C_1$- to $C_4$-alkyl, phenyl or benzyl, $C_1$- to $C_4$-alkylmercapto, phenylmercapto, cyclopentyl and cyclohexyl. The cyclic radicals can in turn be substituted by $C_1$- to $C_4$-alkyl, nitro or the abovementioned radicals. The aryl radicals mentioned in the formulae (I) and (II) can also carry these substituents.

Examples of these substituents which may be mentioned are: F, Cl, Br, CN, $COCH_3$, $COC_2H_5$, $COC_6H_5$, $COOCH_3$, $COOC_2H_5$, $COOC_3H_7$, $COOC_4H_9$, $COOCH_2C_6H_5$, $CONH_2$, $CONHCH_3$, $CON(CH_3)_2$, $CONHC_6H_5$, $CONHCH_2C_6H_5$, OH, $OCH_3$, $OC_2H_5$, $OC_3H_7$, $OC_4H_9$, $OC_6H_5$, $OC_6H_4Cl$ (o-, m- or p-), $OC_6H_4CH_3$ (o-, m- or p-), $OCH_2C_6H_5$, $OCH_2C_6H_4Cl$ (o-, m- or p-), 2-, 3- or 4-cyclopentyl-phenoxy, 2-, 3- or 4-cyclohexyl-phenoxy, 2-, 3- or 4-tert.-butyl-phenoxy, 2-, 3- or 4-phenyl-phenoxy, $OCOCH_3$, $OCOC_2H_5$, $OCOC_3H_7$, $OCOC_6H_5$, $OCOC_6H_4CH_3$ (o-, m- or p-), $OCOC_6H_4Cl$ (o-, m- or p-), $OCOC_6H_4OCH_3$ (o-, m- or p-), $OCOC_6H_4C_6H_5$ (p-), $OCOCH_2C_6H_5$, $OCOCH_2C_6H_4CH_3$ (o-, m- or p-), $OCOCH_2C_6H_4Cl$ (o-, m- or p-), $OCONHCH_3$, $OCONHC_2H_5$, $OCONHC_3H_7$, $OCONHC_4H_9$, $OCONHC_6H_5$, $OCON(CH_3)_2$, $OCON(C_2H_5)_2$, $SCH_3$, $SC_2H_5$, $SC_3H_7$, $SC_4H_9$, $SC_6H_5$, $SO_2C_6H_5$, benzthiazol-2-yl-mercapto, $NHCOCH_3$, $NHCOC_2H_5$, $NHCOC_6H_5$, $NHSO_2CH_3$, $NHSO_2C_6H_5$, $NHSO_2CH_2C_6H_5$ and the like.

It is clear that no limitation is intended by naming the more customary non-ionic substituents, but that these allow many more variations in the scope of the invention.

Conjoint cyclisation of the radicals $R^1$ and $R^2$ with the N atom to which they are bonded gives heterocyclic groups of the following type:

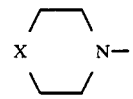

in which

X is a direct bond, $CH_2$, O, S, $SO_2$, NH, $NCH_3$, $NC_2H_5$, NCHO, $NCOCH_3$ or $NSO_2CH_3$.

By bridges which connect an aryl radical with an alkyl or alkenyl radical represented by R and $R_1$ and $R_2$ or $R_3$ and $R_4$, there may be understood, for example: —O—$(CH_2)_m$—, —O—$CH_2$—$CH_2$—O—$(CH_2)_m$—, —O—CO—$(CH_2)_n$—, —COO—$(CH_2)_p$—, —O—CO—NH—$(CH_2)_n$—, —NH— and —NH—CO—$(CH_2)_n$, m being 0, 1 or 2, n being 0 or 1 and p being 1 or 2 and the left-hand side of the bridge being bonded to the alkyl or alkenyl radical.

An abovementioned aryl radical is understood, in particular, as phenyl or diphenyl, preferred substituents of which are: 1 to 3 $C_1$- to $C_3$-alkyl, $C_1$- to $C_4$-alkoxy, $C_1$- to $C_4$-alkoxycarbonyl, $C_5$- to $C_6$-cycloalkyl, $CH_2C_6H_5$, $C(CH_3)_2C_6H_5$, $OC_6H_5$, $OCH_2C_6H_5$, $SO_2C_6H_5$ or CN radicals, and furthermore 1 to 3 Cl atoms or 1 or 2 F or Br atoms.

The term halogen above preferably represents chlorine, and in addition fluorine or bromine.

Possible anions An⁻ are the inorganic and organic anions customary for cationic dyestuffs (compare, for example, German Offenlegungsschriften Nos.

2,128,326, pages 5–7, and 2,520,816, pages 4–6). Colourless anions which impart to the dyestuff in question the solubility properties desired for the intended dyeing operation are preferred.

The anion is in most cases determined by the preparation process and by any purification of the cationic compounds which may be carried out. In general, the dyestuffs are in the form of halides, in particular chlorides or bromides, or methosulphates, ethosulphates, sulphates, nitrates, chlorozincates, benzene-, toluene- or naphthalene-sulphonates, acetates, lactates and the like. These anions can be replaced by others in a known manner. This also includes the possibility of precipitating the dyestuff cations with anions which render them sparingly soluble and if appropriate also with complex anions ("FANAL salts"), or with dyestuff anions.

Of the dyestuffs of the formula I, those wherein

R represents a lower alkyl or alkenyl radical which is substituted by an aryl radical, directly or via a bridge, or wherein $R^1$ and/or $R^2$ independently of one another represent a lower alkyl or alkenyl radical which is substituted by an aryl radical, directly or via a bridge, or an aryl radical, are to be singled out.

The dyestuffs of the general formula

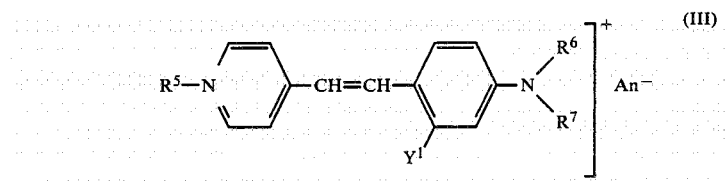

wherein $An^-$ has the abovementioned meaning, $R^5$, $R^6$ and $R^7$ represent $C_1$- to $C_4$-alkyl, which can be substituted by phenyl or $C_1$- to $C_4$-alkoxycarbonyl, $C_3$- or $C_4$-alkenyl, which can be substituted by phenyl, $C_2$- to $C_4$-alkyl, which is substituted by hydroxyl, $C_1$- to $C_4$-alkoxy, phenoxy, benzyloxy, benzoyloxy, benzamido, phenylsulphamido, mesylamino, $C_1$- to $C_3$-alkylcarbonyloxy, $C_1$- to $C_4$-alkylcarbamoyloxy, phenylcarbamoyloxy, chlorine or cyano, or $C_3$- or $C_4$-alkyl, which is substituted by 2 hydroxyl, methoxy, ethoxy or acetoxy radicals or chlorine atoms, it being possible for the phenyl radicals in turn to be substituted by one hydroxyl, $C_1$- to $C_4$-alkoxy, $C_1$- to $C_4$-alkoxycarbonyl, $C_5$- or $C_6$-cycloalkyl, benzyl, 2-phenyl-prop-2-yl, phenoxy, benzyloxy, phenylmercapto, phenylsulphonyl, nitro or cyano radical or by 1–3 fluorine, chlorine or bromine atoms or $C_1$- or $C_4$-alkyl radicals, and wherein at least one of the radicals $R^5$, $R^6$ or $R^7$ denotes a $C_1$- to $C_4$-alkyl group which is substituted by phenyl or one of the abovementioned radicals containing a phenyl group, or $R^6$ or $R^7$ represents a phenyl group, which can be substituted by the abovementioned radicals, and $Y^1$ is hydrogen or methyl, are of particular industrial interest.

Of the dyestuffs of the formula III, those wherein $R^5$, $R^6$ and $R^7$ represent $C_3$- or $C_4$-alkenyl, $C_1$- to $C_3$-alkyl, which can be substituted by phenyl or $C_1$- to $C_4$-alkoxycarbonyl, $C_2$- or $C_3$-alkyl, which is substituted by $C_1$- to $C_4$-alkoxy, phenoxy, benzyloxy, benzoyloxy, $C_1$- to $C_3$-alkylcarbonyloxy, phenylcarbamoyloxy, chlorine or cyano, or $C_3$- or $C_4$-alkyl, which is substituted by 1 or 2 hydroxyl, methoxy, ethoxy or acetoxy groups or chlorine atoms, it being possible for the phenyl radicals in turn to be substituted by one hydroxyl, $C_1$- to $C_4$-alkoxy, cyclohexyl, benzyl, 2-phenyl-prop-2-yl, phenoxy or benzyloxy radical or bromine atom, by 2 chlorine atoms or by 1–3 $C_1$- to $C_4$-alkyl radicals, may be mentioned in particular.

The new dyestuffs are prepared in a manner which is known per se, by a procedure in which quaternary salts of the formula

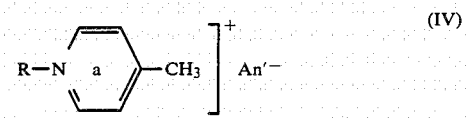

are subjected to a condensation reaction with aldehydes of the formula

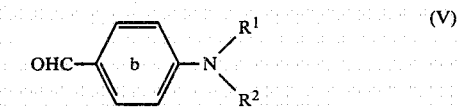

or functional derivatives thereof, such as azomethines, wherein

R, $R^1$, $R^2$, the ring a and the ring b have the abovementioned meanings and $An'^-$ represents an anion, which can be different to the $An^-$ of the end dyestuff.

The condensation reactions are carried out at temperatures between 20° and 140° C., preferably in the range from 50° to 110° C., in an organic solvent. Examples of suitable solvents are alcohols, such as methanol, ethanol and the propanols and butanols, and furthermore benzyl alcohol, ethyl acetate, methyl benzoate, formic acid, acetic acid, $C_2$- to $C_4$-glycols, dimethylformamide, dimethylacetamide, tetramethylurea, acetonitrile, benzonitrile and others. Basic catalysts, such as, for example, triethylamine, pyridine, piperidine, N-ethyl-piperidine, N-methyl-morpholine, alkali metal carbonates, alkali metal acetates and acetates of inorganic or organic nitrogen bases, such as, for example, ammonium acetate or piperidine acetate, can be added to accelerate the condensation reaction.

A large number of quaternary salts of the formula IV are accessible from optionally further substituted 4-methyl-pyridines, by reaction with alkylating agents R-An' in a known manner. In many cases, an intermediate compound is first prepared, such as, for example, N-hydroxyethyl-picolinium chloride, which only gives the desired starting material IV in a 2nd stage, for example by reaction with acyl anhydrides, isocyanates and the like.

The aldehydes of the formula V are in most cases known, or they can be obtained by customary methods, by subjecting the corresponding tertiary aromatic amines to formylation, the reactions of Vilsmeier and Haack or of Duff (J. Chem. Soc. (London) 1952, pages 1,159–1,164, advantageously by the procedure according to German Patent Specification No. 1,206,879) being used in particular.

Suitable aldehydes V are described, for example, in the following publications: U.S. Patent Specification Nos. 2,583,551, 2,766,233, 2,850,520, 3,240,783, 3,247,211, 3,349,098, 3,386,491, 3,453,270, 3,453,280, 3,483,218, 3,504,010, 3,553,245, 3,595,863, 3,597,434, 3,631,049, 3,635,957, 3,728,374, 3,756,778, 3,844,715, 3,855,215, 3,869,495, 3,891,691, 3,909,198, 3,927,063 and 3,948,938, German Auslegeschriften Nos. 1,067,156, 1,245,005, 1,569,686 and 1,813,363, German Offenlegungsschriften Nos. 1,569,674, 1,569,678, 1,569,731, 1,959,706, 2,017,919, 2,042,498, 2,058,405, 2,114,574, 2,147,810, 2,147,811, 2,300,034, 2,316,766, 2,344,075, 2,409,464, 2,445,583, 2,446,759, 2,447,229 and 2,542,376, Swiss Patent Specifications 435,517, 492,758, 493,596, 505,875, 505,876 and 516,628, British Patent Specification Nos. 1,027,026, 1,110,714, 1,257,926 and 1,263,257, Belgian Patent Specification Nos. 665,660, 703,181, 706,612 and 835,291, Dutch Patent Specification Nos. 64.14,819, Japanese Patent Specification Nos. 40.28,253 and 49.23,224 (=U.S. Patent Application No. 248,483) and Japanese Patent Application Nos. 70/28,026, 71/23,508 and 71/29,466.

The dyestuffs according to the invention are suitable for dyeing, printing and bulk-dyeing materials which consist predominantly or completely of polyacrylonitrile or copolymers thereof with other vinyl monomers, such as vinylidene cyanide, vinylidene chloride, vinyl chloride, vinyl acetate, vinyl alcohol, acrylates or methacrylates, or of acid-modified polyesters or polyamides. The brilliant golden yellow to bluish-tinged red dyeings and prints obtained, especially on polyacrylonitrile, are distinguished by good general fastness properties, in particular by very good fastness to wet processing and perspiration, and by an outstanding affinity for the fibre and by a high stability to changes in pH.

The dyestuffs are furthermore suitable for the other known applications of cationic dyestuffs, such as, for example, dyeing and printing cellulose acetate, coir fibres, jute, sisal, silk and tannin-treated cotton and leather, for the preparation of ball-point pen pastes, inter alia by precipitation with anionic dyestuffs, and of rubber-stamp inks and for the use in flexographic printing.

The excellent suitability of the dyestuffs according to the invention for beater-dyeing sized and unsized paper in golden yellow to bluish-tinged red shades is to be especially emphasised, particularly high affinities for paper pulp containing lignin (containing mechanical wood pulp) being found. Some of the new dyestuffs are moreover distinguished by high affinities to lignin-free paper pulps (for example bleached sulphite pulp), so that such paper pulps can be dyed with considerably reduced colouring of the effluent.

The dyestuffs predominantly have good solubilities in water and polar organic solvents, so that they are suitable for the preparation of stable, highly concentrated solutions.

Possible polar organic solvents are acetic acid, glycolic acid, lactic acid, $C_2$- to $C_4$-glycols, glycol monoalkyl and dialkyl ethers, glycol monoacetates and diacetates, $C_1$- to $C_4$-alkanols, benzyl alcohol and the optimum solvents, or mixtures thereof, customary for the various use forms.

EXAMPLE 1

22 g of 4,N-dimethyl-pyridinium methosulphate are dissolved in 100 ml of isopropanol of 80° C., 22 g of N-ethyl-N-benzyl-4-amino-benzaldehyde and 2 g of piperidine are added and the mixture is heated to the reflux temperature for 6 hours, whilst stirring. During this procedure, the solution becomes deep red in colour and the dyestuff of the formula

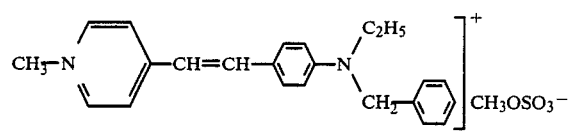

is formed. The product crystallises out and, some time after the reaction solution has been cooled to 0°–5° C., is filtered off, washed with cold isopropanol and finally dried at 50° C. in vacuo. The yield, including a second fraction from the concentrated mother liquor, is 38 g of dyestuff in the form of luminous red crystals of melting point 136°–140° C., which can be further purified by recrystallisation from a large quantity of isopropanol.

$\lambda_{max}(H_2O) = 460$ nm.

The resulting dyestuff dyes polyacrylonitrile in an exceptionally brilliant orange shade, the dyeings having a good level of fastness. It is also suitable for the preparation of rubber-stamp inks and ball-point pen pastes and for flexographic printing.

When used for dyeing paper pulps containing mechanical wood pulp, it is found that the dyestuff has a high affinity for the fibre and the effluent is only slightly coloured. The dyed paper is a very clear orange shade.

EXAMPLE 2

87 g of 4-methyl-N-β-hydroxyethyl-pyridinium chloride and 114 g of N-ethyl-N-benzyl-4-amino-benzaldehyde are dissolved in 300 ml of isopropanol and, after adding 1 g of piperidine, the mixture is heated to 80°–85° C. for 6 hours, whilst stirring. The dyestuff of the formula

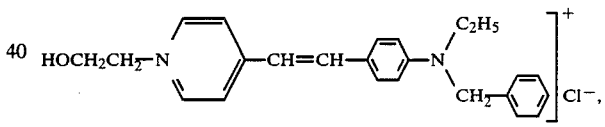

is formed by the condensation reaction and is obtained as a resinous red-brown residue (about 200 g) by subsequently distilling off all of the solvent under a water-pump vacuum.

Dissolving the coloured resin in the same number of parts of water results in 400 g of an approximately 50% strength, stable dyestuff solution ($\lambda_{max}/H_2O = 468$ nm). The solution is suitable for dyeing polyacrylonitrile and acid-modified polyester fibres, and is outstandingly suitable for beater-dyeing lignin-containing paper pulps in clear orange shades.

The 4-methyl-N-β-hydroxyethyl-pyridinium chloride employed for the preparation of the dyestuff is obtained as follows:

99 g of γ-picoline (96% pure) are added to a solution of 81 g of 2-chloroethanol in 500 ml of dry toluene at 100° C. and the reaction mixture is heated to the reflux temperature (internal temperature of about 112°–114° C.) for 15 hours. After cooling the batch, the quaternary salt which has crystallised out is filtered off, washed with dry toluene and dried at 80° C. in vacuo. Yield: 140 g of melting point 96°–98° C. The product is very hygroscopic. It can also be prepared without a solvent, at 80°–140° C.

Using appropriate starting materials in a procedure analogous to that in the above examples, further dyestuffs of the formula R—N⟨⟩—⟨⟩—CH=CH—⟨b⟩—N(R¹)(R²)  An⁻  [+]

according to the invention are obtained. These dyestuffs have comparable coloristic properties when used for dyeing the abovementioned materials, in particular polyacrylonitrile and acid-modified polyesters and polyamides, and, preferably, for beater-dyeing sized and unsized paper pulps, the effluents being only slightly coloured. A selection of these dyestuffs, including the colour shade of beater-dyed paper, is given in the following table.

EXAMPLE 48

11 g of N-benzyl-γ-picolinium chloride and 7.5 g of 4-dimethylamino-benzaldehyde in 30 ml of isopropanol are heated to the reflux temperature for 6 hours, 0.5 g of piperidine being added. After cooling, the mixture is subsequently further stirred for some hours at room temperature and the product which has crystallised out is isolated by filtration, washing with toluene and drying at 50° C. in vacuo. Yield: 10.5 g of red crystals with a melting range of 232°–248° C.

$\gamma_{max}/CH_3OH = 486$ nm.

The dyestuff corresponds to the formula

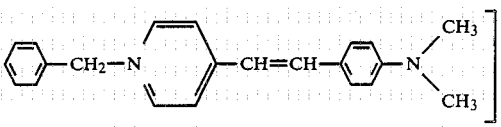

TABLE 1

| Example No. | R | Substituent in ring b | R¹ | R² | Colour shade of beater-dyed paper |
|---|---|---|---|---|---|
| 3 | CH₃ | — | CH₃ | CH₂C₆H₅ | orange |
| 4 | " | 2-CH₃ | C₂H₅ | " | yellow-orange |
| 5 | " | " | CH₃ | " | " |
| 6 | " | — | C₂H₄Cl | " | orange |
| 7 | " | — | C₂H₄CN | " | orange-yellow |
| 8 | " | 2-CH₃ | C₂H₄Cl | CH₂CH₂C₆H₅ | red-orange |
| 9 | " | " | C₂H₄CN | " | golden yellow |
| 10 | " | — | " | " | orange-yellow |
| 11 | " | — | C₂H₄Cl | " | yellow-orange |
| 12 | " | — | C₂H₅ | C₂H₄OC₆H₄C₆H₅(p) | orange |
| 13 | C₂H₅ | — | " | CH₂C₆H₅ | red-orange |
| 14 | CH₂=CH—CH₂ | — | " | " | claret |
| 15 | HOCH₂CH₂ | 2-CH₃ | " | " | orange-red |
| 16 | " | 2,5-di-OCH₃ | CH₃ | CH₂C₆H₅ | orange |
| 17 | " | 2-Cl | " | " | " |
| 18 | " | — | C₂H₄Cl | " | " |
| 19 | " | — | C₂H₄CN | " | orange-yellow |
| 20 | " | — | C₂H₄Cl | CH₂CH₂C₆H₅ | yellow-orange |
| 21 | " | — | C₂H₄CN | " | orange-yellow |
| 22 | " | — | C₂H₄COOC₂H₅ | " | " |
| 23 | " | — | C₄H₉ | CH₂C₆H₅ | orange |
| 24 | " | — | C₂H₅ | C₂H₄OC₆H₄C₆H₅(p) | red-orange |
| 25 | " | — | " | C₂H₄OC₆H₄—⟨H⟩(p) | " |
| 26 | " | 2-CH₃ | " | C₂H₄OC₆H₄C₆H₅(p) | " |
| 27 | " | " | " | C₂H₄OC₆H₄CH₃(p) | orange |
| 28 | " | " | " | C₂H₄OC₆H₄Cl(p) | " |
| 29 | " | " | " | C₂H₄OC₆H₄COOCH₃(p) | " |
| 30 | " | — | C₂H₄OCH₃ | CH₂C₆H₅ | " |
| 31 | " | — | CH₃ | C₂H₄OC₆H₅ | " |
| 32 | " | 2-CH₃ | C₂H₅ | " | red-orange |
| 33 | " | " | " | C₂H₄OCH₂C₆H₅ | " |
| 34 | " | " | " | C₂H₄OCH₂C₆H₄Cl(p) | " |
| 35 | " | " | " | C₂H₄OCOC₆H₅ | " |
| 36 | " | " | " | C₂H₄OCONHC₆H₅ | " |
| 37 | " | " | " | C₂H₄OCOC₆H₄Cl(o) | " |
| 38 | " | " | " | C₂H₄OC₆H₄—tert.-C₄H₉(p) | " |
| 39 | " | " | " | C₂H₄OCOCH₂C₆H₅ | " |
| 40 | " | " | " | CH₂CH(CH₃)OC₆H₅ | " |
| 41 | " | " | " | C₂H₄SC₆H₅ | " |
| 42 | " | " | " | C₂H₄SO₂C₆H₅ | " |
| 43 | " | " | " | C₂H₄NHCOC₆H₅ | " |
| 44 | " | " | " | C₂H₄OC₆H₄OC₆H₅(p) | " |
| 45 | HOCH₂CHOHCH₂ | — | " | C₂H₄OC₆H₄C₆H₅(p) | " |
| 46 | " | 2-CH₃ | " | " | orange-red |
| 47 | CH₃COOC₂H₄ | " | " | CH₂C₆H₅ | " |
| 47a | HOCH(CH₃)CH₂— | — | " | " | orange | and is suitable for dyeing acid-modified synthetic fibres, but in particular for beater-dyeing unsized and sized paper pulp, and imparts a brilliant orange-red shade to these materials. The colouring of the effluent in the case of dyeing paper is remarkably slight.

EXAMPLE 49

26.6 g of 4-diethylamino-benzaldehyde and 4 ml of piperidine are added to a solution of 46.7 g of 4-methyl-N-β-phenylethyl-pyridinium chloride in 60 ml of isopropanol and the mixture is heated to 80° C. for 4 hours and, after adding a further 1 ml of piperidine, to 90° C. for a further 3 hours. Thereafter, the solvent is distilled off completely, under reduced pressure, and the resinous residue (about 70 g) which consists of the dyestuff of the formula

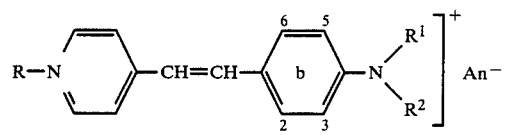

according to the invention are obtained. These dyestuffs have comparable coloristic properties when used for dyeing the abovementioned fibre materials, such as polyacrylonitrile and acid-modified polyesters, and, preferably, for beater-dyeing unsized and sized paper pulps, the effluents being only slightly coloured. A selection of dyestuffs which carry an aryl radical in the radical R and the colour shades of paper beater-dyed with these dyestuffs are given in the following Table 2.

TABLE 2

| Example No. | R | Substituent in ring b | $R^1$ | $R^2$ | Colour shade of beater-dyed paper |
|---|---|---|---|---|---|
| 50 | $C_6H_5CH_2$ | — | $C_2H_5$ | $C_2H_5$ | bluish-tinged red |
| 51 | " | 2-$CH_3$ | " | " | " |
| 52 | " | " | $CH_3$ | $CH_3$ | red |
| 53 | " | — | | $C_2H_4OC_2H_4$ | red-orange |
| 54 | " | — | $CH_3$ | $C_2H_4Cl$ | red |
| 55 | " | — | $C_2H_5$ | $C_2H_4OCOCH_3$ | " |
| 56 | " | — | $CH_3$ | $C_2H_4CN$ | " |
| 57 | " | — | $C_2H_5$ | $CH_2C_6H_5$ | bluish-tinged red |
| 58 | " | — | " | $C_2H_4OCH_3$ | red |
| 59 | " | — | " | $C_2H_4OH$ | " |
| 60 | " | — | " | $C_3H_6NHCOCH_3$ | " |
| 61 | p-$ClC_6H_4CH_2$ | — | $CH_3$ | $CH_3$ | " |
| 62 | $C_6H_5CH_2CH_2$ | — | " | " | " |
| 63 | " | 2-$CH_3$ | $C_2H_5$ | $C_2H_5$ | bluish-tinged red |
| 64 | $C_6H_5OCH_2CH_2$ | — | " | " | red |
| 65 | " | — | $CH_3$ | $CH_3$ | red |
| 66 | " | 2-$CH_3$ | $C_2H_5$ | $C_2H_5$ | bluish-tinged red |
| 67 | p-$CH_3C_6H_4OCH_2CH_2$ | — | " | " | red |
| 68 | $C_6H_5COOCH_2CH_2$ | — | " | " | " |
| 69 | $C_6H_5NHCOOCH_2CH_2$ | — | " | " | " |

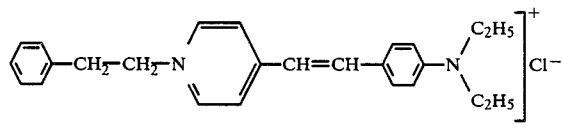

$\lambda_{max}(H_2O)=476$ nm is taken up in 160 g of a mixture of acetic acid and 80% strength aqueous lactic acid (7:3 W/W), with slight warming. A clear, approximately 30% strength dyestuff solution which can be diluted with water in all proportions and, when used for beater-dyeing paper containing mechanical wood pulp, imparts to the paper a brilliant red dyeing without greatly colouring the effluent.

The phenethyl-γ-picolinium chloride used as the starting substance is obtained in a crude, brownish form in virtually quantitative yield by warming a mixture of 70.3 g of β-phenylethyl chloride and 47.5 g of γ-picoline to 120°–125° C. for 8 hours and then distilling off excess γ-picoline under 20 mbars/120° C.

Using the appropriate starting substances in a procedure analogous to that in the above examples, other dyestuffs of the formula

EXAMPLE 70

An amount of polyacrylonitrile fibre corresponding to a liquor ratio of 1:40 is introduced, at 40° C., into an aqueous dyebath which contains, per 1,000 ml, 0.75 g of 30% strength acetic acid, 0.38 g of sodium acetate and 0.15 g of the dyestuff described in Example 1, the bath is heated to the boiling point in the course of 20–30 minutes and dyeing is carried out at the boiling point for 30–60 minutes. The dyed material, which is subsequently rinsed and dried, has a brilliant, orange dyeing which is generally distinguished by good fastness properties, in particular by very good fastness to washing and decatising.

If wet-spun polyacrylonitrile fibres are dyed with the same dyestuff under the conditions of the so-called NEOCHROM process, dyeings with a comparably high level of fastness are likewise obtained.

EXAMPLE 71

The desired amount of a stock solution prepared from 15 g of the dyestuff according to Example 12, 15 g of polyacrylonitrile and 70 g of dimethylformamide is added to a customary spinning solution of polyacrylonitrile and the coloured solution is spun in a known manner. Clear orange polyacrylonitrile filaments which have good fastness properties, in particular very good fastness to washing and decatising, result.

EXAMPLE 72

A polyacrylonitrile fabric is printed with a printing paste of the following composition: 30 g of the dyestuff described in Example 48, 50 g of diethylene thioglycol, 30 g of cyclohexanol, 30 g of 30% strength acetic acid, 500 g of crystal gum, 30 g of aqueous zinc nitrate solution (d=1.5 gcm$^{-3}$) and 330 g of water. The resulting red print is dried, steamed for 30 minutes and then rinsed. It is distinguished by good fastness properties.

EXAMPLE 73

Acid-modified polyglycol terephthalate fibres (for example those described in Belgian Patent Specification No. 549,179 and in U.S. Patent Specification No. 2,893,816) are introduced, at 20° C. and at a liquor ratio of 1:40, into a dyebath which contains, per 1,000 ml, 3–10 g of sodium sulphate, 0.1–2 g of oleyl polyglycol ether (containing 50 mols of ethylene oxide), 0–15 g of dimethylbenzyl-dodecylammonium chloride and 0.3 g of the dyestuff according to Example 9 and which has been adjusted to a pH value of 4.5–5.5 with acetic acid or sodium acetate. The bath is heated to 98° C. in the course of 30 minutes and kept at this temperature for 60 minutes. After subsequent rinsing and drying, the fibres are dyed a brilliant golden yellow with good fastness properties.

EXAMPLE 74

0.5 g of oleyl polyglycol ether (containing 50 mols of ethylene oxide) are added to 0.15 g of the dyestuff solution according to Example 15, the mixture is made up to 500 ml with water and introduced into a 500 ml dyeing beaker in a heated waterbath, and the pH value of the dye liquor is adjusted to 4.5–5. 10 g of acid-modified polyamide piece goods are kept in continuous motion in this liquor, whilst the bath temperature is increased to 100° C. in the course of 15 minutes. After dyeing at the boiling point for 15–20 minutes, the dyed material is rinsed and dried, for example by ironing or at 60°–70° C. in a drying cabinet. A clear, red-orange dyeing with good fastness properties is obtained.

EXAMPLE 75

A dry stuff consisting of 60% of mechanical wood pulp and 40% of unbleached sulphite cellulose is made into a slurry, in a hollander, and beaten to a SR freeness of 40° with water in an amount such that the dry content is a little more than 2.5%, and water is then added until the dry content of the high-density stuff is exactly 2.5%.

5 g of a 0.25% strength aqueous solution of the dyestuff according to Example 2 are added to 200 g of this high-density stuff, the mixture is stirred for about 5 minutes, 2% of resin size and 4% of alum, relative to the dry stuff, are added and the mixture is again stirred for some minutes until homogeneous. The pulp is diluted to 700 ml with about 500 g of water and sheets of paper are produced therefrom in a known manner, by filtration over a sheet-forming machine. They have a brilliant orange colour. About 3% of dyestuff not bonded to the paper are determined photometrically (at $\lambda_{max}$=470 nm) in the effluent from the sheet-forming machine. When unsized paper pulps are dyed by an otherwise identical procedure, about 3% of non-fixed dyestuff are likewise determined.

Virtually all the dyestuffs according to the invention produce a similarly low coloration of the effluent when used under the above conditions.

EXAMPLE 76

5 g of a 0.5% strength aqueous solution of the dyestuff of Example 26 are added to 200 g of a 2.5% strength high-density stuff (SR freeness: 35°) prepared analogously to Example 75 but exclusively using bleached sulphite cellulose, and the pulp was processed to paper without the addition of resin size and alum. Sheets of paper dyed in a strong, red-orange shade are obtained. According to photometric determination, the effluent contains only about 14% of the dyestuff employed. If the paper pulp is dyed in the presence of 2% of resin size and 4% of alum (compare Example 75), a similar result is obtained and only about 5% of the dyestuff remain in the effluent.

EXAMPLE 77

21 g of N-methyl-N-phenyl-4-amino-benzaldehyde and 19 g of 4-methyl-N-β-hydroxyethyl-pyridinium chloride are dissolved in 50 ml of isopropanol and, after adding 1 g of piperidine, the mixture is heated to 80° C. for 6 hours. The solvent is then removed by distilling off under reduced pressure, and about 40 g of a coloured resin are obtained. 40 g of water are added to the resin and, after stirring the mixture at 80° C. for 0.5 hour, about 80 g of an approximately 50% strength solution ($\lambda_{max}$ in H$_2$O=454 nm) of the dyestuff of the formula

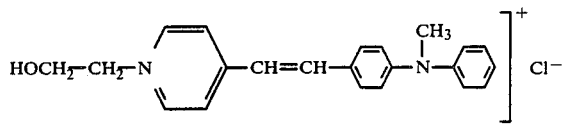

are obtained. When used analogously to Example 75, the dyestuff dyes paper pulps containing mechanical wood pulp in exceptionally clear orange-yellow shades, the effluent being only slightly coloured.

EXAMPLE 78

If 25.5 g of N-methyl-N-p-phenetidyl-4-aminobenzaldehyde are employed instead of the aldehyde used in the preceding example, about 90 g of an approximately 50% strength aqueous formulation of the dyestuff of the formula

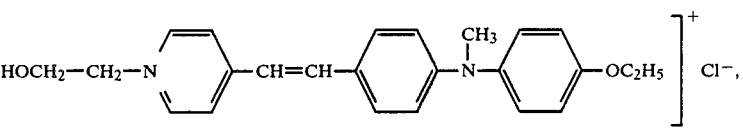

the shade and coloristic properties of which largely correspond to those of the dyestuff of Example 77, are accordingly obtained.

I claim:
1. A dyestuff of the formula

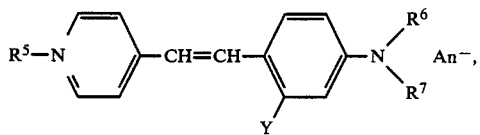

wherein
- $An^-$ is an anion,
- $R^5$, $R^6$ and $R^7$ each independently is $C_1$- to $C_4$-alkyl, $C_1$- to $C_4$-alkyl substituted by phenyl, $C_2$- to $C_4$-alkyl substituted by hydroxyl, $C_1$- to $C_4$-alkoxy, phenoxy, benzyloxy, benzoyloxy, $C_1$- to $C_3$-alkylcarbonyloxy, chlorine or cyano, or $C_3$- or $C_4$-alkyl substituted by two hydroxyl or chlorine, it being possible for the various phenyl radicals to be substituted by one $C_1$- to $C_4$-alkoxy, $C_6$-cycloalkyl, benzyl, phenoxy, benzyloxy, or cyano radical or by one to three fluorine, chlorine or bromine atoms or $C_1$- to $C_4$-alkyl radicals,
- at least one of the radicals $R^5$, $R^6$, or $R^7$ being $C_1$- to $C_4$-alkyl group which is substituted by phenyl or by one of the above-mentioned radicals containing a phenyl group or $R^6$ or $R^7$ represent phenyl, which is unsubstituted or substituted by the above mentioned radicals, and
- Y is hydrogen or methyl.

2. A dyestuff according to claim 1, wherein
$R^5$ is methyl, ethyl, hydroxyethyl or $\beta$-hydroxypropyl,
$R^6$ is methyl or ethyl, and
$R^7$ is benzyl.

3. A dyestuff according to claim 1, wherein
$R^5$ is benzyl, phenylethyl or phenoxyethyl,
$R^6$ is methyl, ethyl or hydroxyethyl,
$R^7$ is methyl, ethyl or benzyl.

* * * * *